W. H. MILLSPAUGH.
PROCESS OF TREATING, MOLDING, AND CASTING MATERIALS AND APPARATUS THEREFOR.
APPLICATION FILED APR. 19, 1911.
1,058,250.
Patented Apr. 8, 1913.
3 SHEETS—SHEET 1.
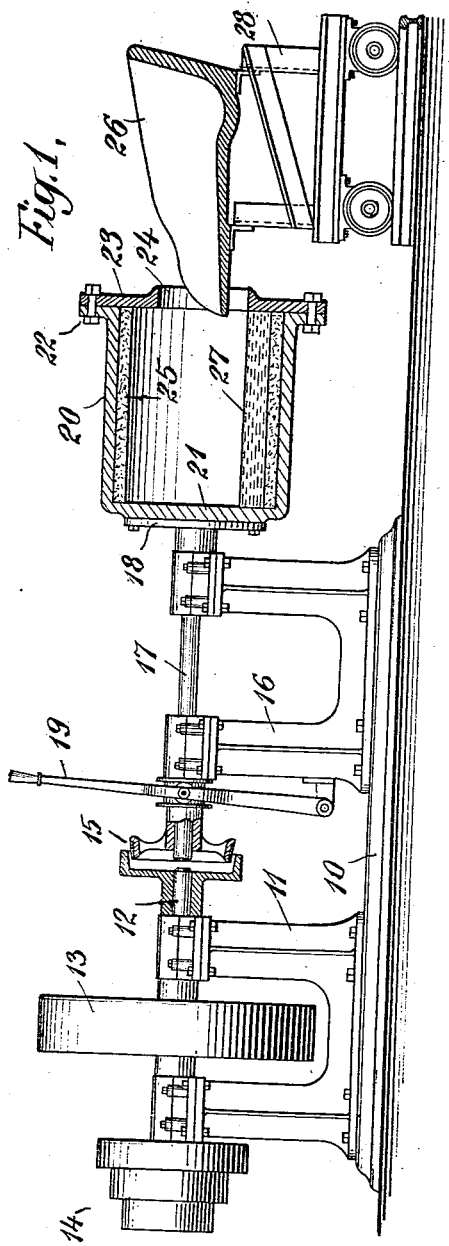
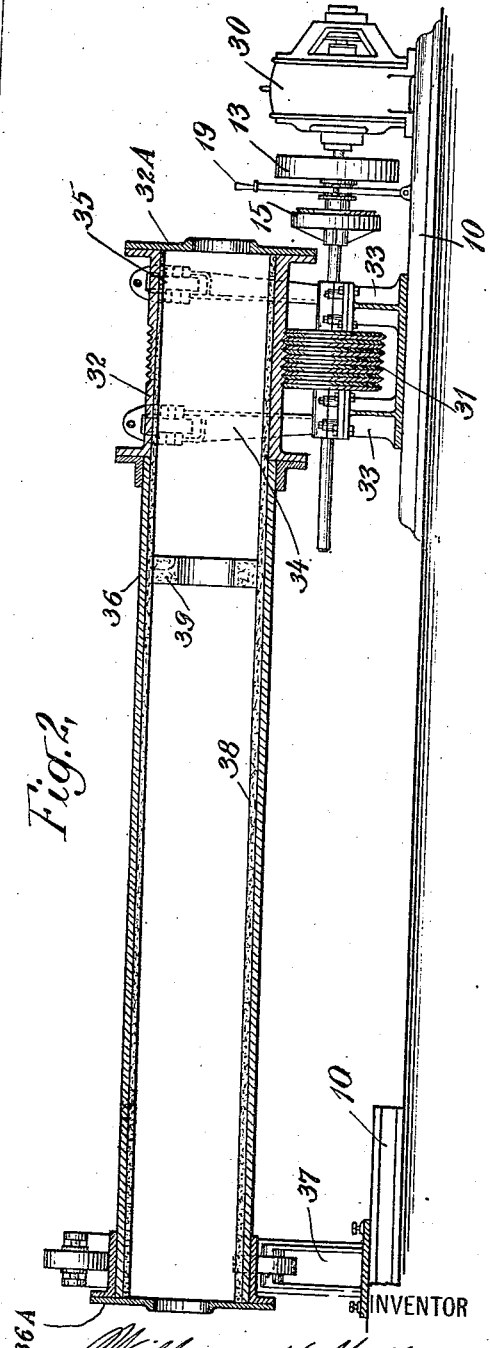

W. H. MILLSPAUGH.
PROCESS OF TREATING, MOLDING, AND CASTING MATERIALS AND APPARATUS THEREFOR.
APPLICATION FILED APR. 19, 1911.
1,058,250.
Patented Apr. 8, 1913.
3 SHEETS—SHEET 2.
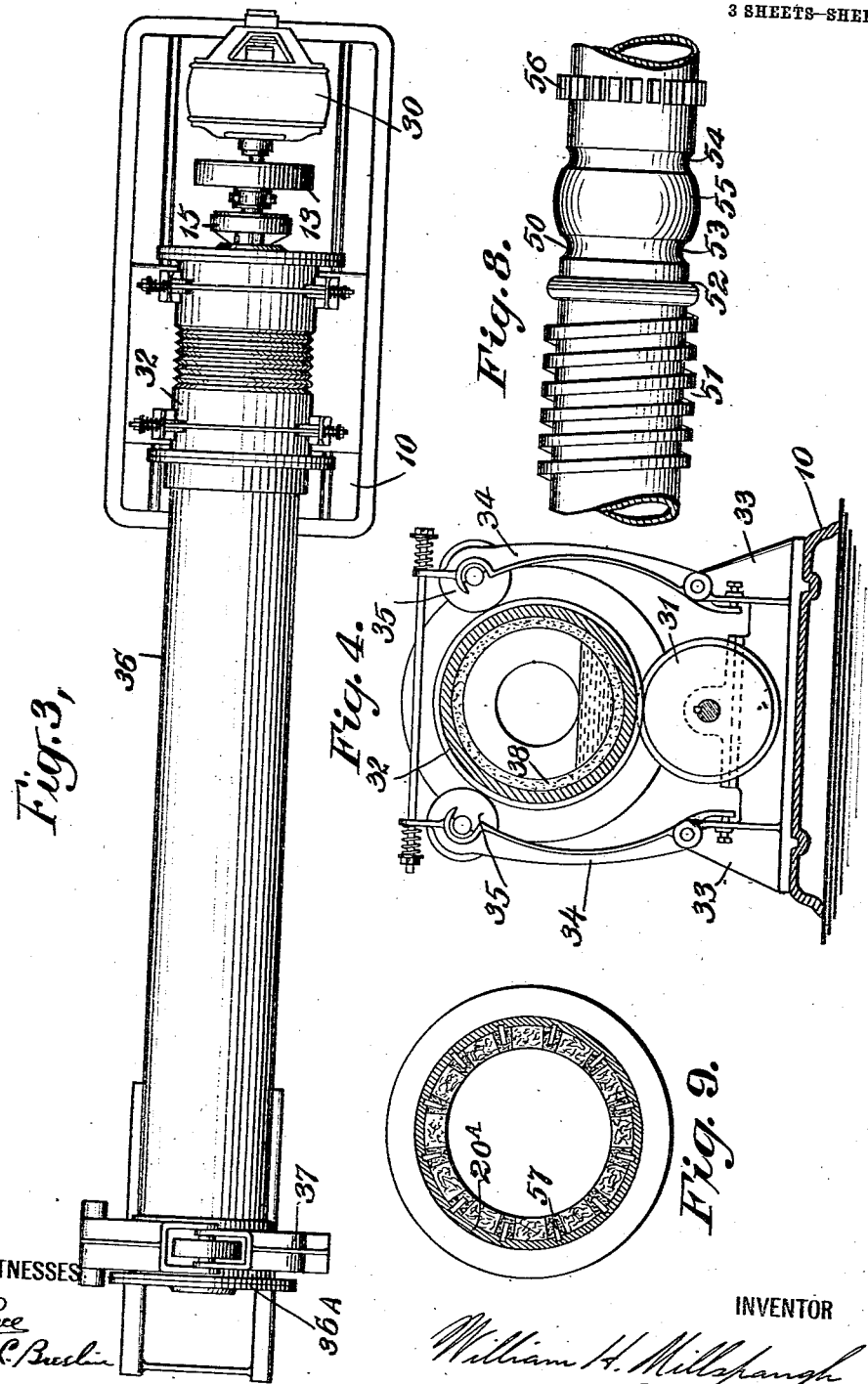
WITNESSES
INVENTOR
William H. Millspaugh
BY
E. W. Marshall
ATTORNEY W. H. MILLSPAUGH.
PROCESS OF TREATING, MOLDING, AND CASTING MATERIALS AND APPARATUS THEREFOR.
APPLICATION FILED APR. 19, 1911.
1,058,250.
Patented Apr. 8, 1913.
3 SHEETS—SHEET 3.
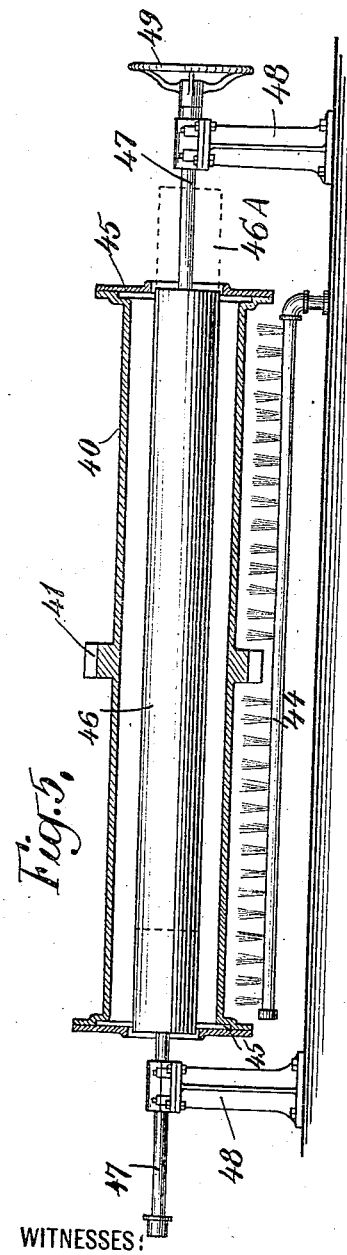
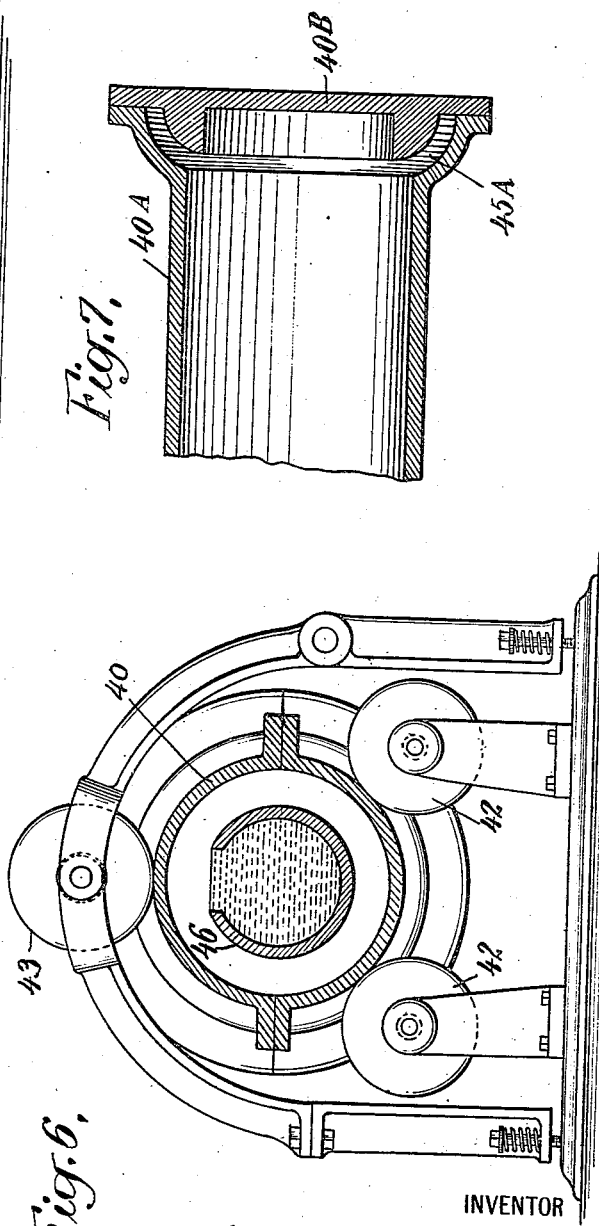

UNITED STATES PATENT OFFICE.

WILLIAM H. MILLSPAUGH, OF SANDUSKY, OHIO.

PROCESS OF TREATING, MOLDING, AND CASTING MATERIALS AND APPARATUS THEREFOR.

1,058,250.

Specification of Letters Patent.

Patented Apr. 8, 1913.

Application filed April 19, 1911. Serial No. 621,997.

*To all whom it may concern:*

Be it known that I, WILLIAM H. MILLSPAUGH, a citizen of the United States, and a resident of Sandusky, in the county of Erie and State of Ohio, United States of America, have invented certain new and useful Improvements in Processes of Treating, Molding, and Casting Materials and Apparatus Therefor, of which the following is a specification.

My invention relates broadly to a novel method of utilizing centrifugal force in the treatment of metals and other materials, and in molding and casting metals, or other substances which are susceptible of being formed into definite shapes under pressure.

The invention also relates to and includes certain apparatus by means of which these objects may be attained.

I will described my invention in the following specification and point out the novel features thereof in the appended claims.

Referring to the drawings, Figure 1 is a side elevation, partly in section, of a simple form of machine embodying my invention, and by means of which my novel method may be carried into effect. Fig. 2 is a sectional side elevation of another machine which I have invented for the same purpose. Fig. 3 is a plan view, and Fig. 4 an end elevation, partly in section, of the machine which is shown in Fig. 2. In Fig. 5 a modified form of an apparatus is shown in side elevation, partly in section. Fig. 6 is a sectional end view on a larger scale of the apparatus shown in Fig. 5. Fig. 7 is a sectional side elevation of a portion of such a machine as is shown in Fig. 5, with the end thereof constructed somewhat differently for the purpose of forming another shape of flange. Fig. 8 is a side elevation of a hollow circular body with its external surface made in several different shapes and designs. This figure illustrates some of the results which may be obtained by the use of the apparatus and the method of manufacture herein disclosed. Fig. 9 shows in sectional end elevation a portion of one form of my improved apparatus with a cylinder having its internal surface divided longitudinally into a plurality of channels or pockets.

Like characters of reference designate corresponding parts in all of the figures.

10 designates a base upon which the apparatus may be mounted. 11 is a pedestal which rotatably supports a driving shaft 12. A fly-wheel 13 is affixed to this shaft. On one end of the driving shaft is a cone-pulley 14 by means of which it may be driven by belt from any suitable source of power. A portion of a friction clutch 15 is affixed to the other end of this shaft.

Another pedestal 16 supports the driven shaft 17 on one end of which is the rest of the friction clutch 15, and on the other end of which is affixed the hub of a flange 18. 19 is a lever by means of which the clutch 15 may be operated.

Bolted to the flange 18 in axial alinement with the shafts 12 and 17 is a cylinder 20, the rear end of which is closed as shown at 21. The other end of this cylindrical member is provided with an annular flange 22 to which is bolted a plate or cylinder-head 23, the central portion 24 of which is open. 25 is a lining which may be provided for the inner surface of the cylinder.

26 designates a pouring trough by means of which molten metal or other material 27 may be introduced into the cylinder 20. In this case the trough is shown mounted upon a truck 28.

Before particularly describing the other mechanisms which are shown in the drawings, I will describe the operation of the apparatus which is illustrated in Fig. 1. A desired amount of material such as molten bronze, for example, is run into the cylinder 20. This will then assume the position in which it is shown at 27. The driving shaft is rotating at a high rate of speed. The operator then throws in the clutch and the cylinder 20 immediately begins to rotate with the shaft 12. The fly-wheel 13 is provided in order to make the acceleration of the cylinder very rapid. It also prevents a too sudden strain being put upon the driving mechanism. The result of this sudden and rapid rotation of the cylinder 20 is that the molten mass 27 will be whirled around over the surface of the lining 25. If this apparatus is used with hot and molten material such as bronze, it is preferably made of a refractory material. Centrifugal force acting upon this mass will force it under high pressure against the lining. This results in the mass being evenly distributed over the mold or the lining so that it becomes a hollow cylindrical body. Another result which is greatly beneficial is that the pressure thus obtained by centrifugal force drives the heavy particles of the mass to the outside of the cylinder thus formed, and the lighter particles, such as dross and impurities, will be squeezed out of this mass and forced onto the inner surface of the hollow cylinder which is being formed. It is obvious that all air or other gas will also be forced out of the mass so that the latter will be extremely dense and free from impurities or air bubbles.

The apparatus need be rotated but a short time as the hollow cylinder formed will quickly set. The impurities on its inner surface may then be brushed or blown off and the cylinder then may be removed from the apparatus by first detaching the end plate 23.

The machine which is shown in Figs. 2, 3 and 4 is designed for the purpose of making long tubes or pipes. In these figures 30 designates an electric motor which is connected to drive a friction wheel 31. The fly-wheel 13 and clutch 15 may be interposed between the motor and the friction wheel if desired. 32 is a cylindrical member flanged at its ends, between which flanges are cut a plurality of V-grooves into which fit similarly shaped annular ribs on the friction wheel. The shaft of the friction wheel is supported in bearings between brackets 33, 33 to which are connected arms 34 which support rollers 35. These rollers run on the outer surface of the cylinder 32 at either side of the grooves therein. Thus the cylindrical member rests upon the friction wheel 31 and is held in position with its axis parallel to that of the shaft of the friction wheel by the rollers 35.

One end of the cylinder 32 may be partly closed by a plate 32ᴬ. At its other end and bolted to the flange thereon is an extension cylinder 36, the other end of which is rotatably supported by rollers in a stand 37. This end of the extension cylinder is partly closed by a plate 36ᴬ. The internal diameters of the cylinders 32 and 36 are equal so that their inner surfaces form a continuous cylinder. These surfaces may be covered with a lining 38 preferably of refractory material.

The extension cylinder is detachable from the rest of the machine and may be replaced by another of greater or shorter length. The roller stand 37 is longitudinally movable on the base 10 so that this same stand may be used to support extension cylinders of different lengths.

A stop core 39 of metal or of sand may be employed if desired to make shorter pipes. When this core is used the end plate 32ᴬ may be omitted. It is also possible to use cylinders such as 32 of different diameters with the same drive. The friction wheel is feathered on a comparatively long shaft, and the support for the brackets 33 on the base 10 is longitudinally movable so that the same driving mechanism may be used with cylinders such as 32 of different lengths.

The inside of the rotary cylinders may be heated by introducing flames, after which molten metal or other material is poured in. The motor may then be started, or, if a clutch is used, it may be running and then thrown into driving engagement with the friction wheel. The cylinders will thus be rotated and will act upon the metal or other material in them in the manner already described. Thus a tube or pipe of great density and strength may be formed. The outside diameter will be determined by the diameter inside of the mold or of the lining 38, and the thickness of the finished article will depend upon the amount of material placed in the cylinders, which, of course, may be accurately predetermined.

40, in Figs. 5 and 6, designates a rotary cylinder which is built in two sections bolted together as shown. This may be driven by a chain running over a sprocket-wheel 41 which surrounds the body of the cylinder and is made in two pieces as is the cylinder 40. This cylinder is supported on rollers 42, 42 in fixed positions. A third roller 43, resiliently supported to allow for expansion of the cylinder, holds it in position. 44 is a gas pipe with a plurality of jets under the cylinder, by means of which it may be heated. In this case each end of the cylinder is flanged and provided with end plates. Between these cylinder flanges and the end plates a space 45 may be left which is of desired size and shape to cause the finished pipe to be formed with annular flanges on its ends.

46 is a trough preferably made in the form of a circular pipe closed at the ends and having a longitudinal opening along one of its sides. This trough is supported by axially alined shafts 47 which are rotatably and slidably mounted in pedestal bearings 48. An operating wheel 49 is on the end of one of these shafts and a stop collar on the end of the other. This trough is pulled out longitudinally into the positions indicated by dotted lines at 46ᴬ in Fig. 5, and then, with its opened side uppermost, is filled with molten material as shown in Fig. 6. Now the trough is pushed back into the cylinder 40, and while the latter is rapidly rotating, is turned upside down. The material which is introduced is acted upon in the manner already described and assumes the form of a pipe flanged at both ends. In order to remove the pipe thus formed the two parts of the cylinder 40 must be separated. This method of introducing the molten material has the advantage of an even initial distribution and affords a simple way of measuring out the quantity of material required. It may, of course, be used with the other forms of mechanism which are shown herein.

When it is desired to form a " bell flange " on the end of a pipe, some such structure as shown in Fig. 7, may be used. In this figure 40^A designates the rotary cylinder and 40^B an end plate. The flanged end of the cylinder and the end plate are constructed to form a space 45^A of the desired shape and size.

If it is desired to have the outside of the finished article some other form than cylindrical, this may be done by making the inside of the rotary member a mold of required shape. In Fig. 8 an illustrative finished article 50 is shown, which has been thus molded by the use of my process. This is a hollow body, one portion 51 of which is shown cylindrical with a projecting spiral rib thereon resembling a square screw-thread. A convex bead is shown at 52, and concave grooves at 53 and 54. Between these curves is a semicircular body 55. The rest of this article is shown in the form of a cylindrical body with a plurality of rectangular lugs 56 projecting therefrom. This figure merely illustrates some of the possible uses of my invention.

In describing the operation of the mechanism shown in Fig. 1 I have pointed out that the invention may be used for removing impurities from metal or other substances. Fig. 9 shows a mechanism arranged for refining metals or other materials. In this figure 20^A designates a portion of a rotary cylinder, the inside of which is divided into a plurality of pockets by means of cores 57, said pockets extending longitudinally of the inner surface of said cylinder and being open toward the axis of rotation. When molten material, such as metal, is acted upon by centrifugal force within this cylinder, it will be driven into these pockets and become formed into blocks or pigs. The dross, dirt, and impurities will be squeezed out under a high pressure obtained by the centrifugal force, and the pigs will be pure, free from air, and of great density.

I am unaware of all the uses to which the invention may be put, but have cited some of them and have illustrated a number of mechanisms which may be employed in carrying them out.

I am aware that centrifugal force has hitherto been used in the treatment of molten metal in small quantities and under limiting conditions which narrowed the scope of its usefulness. But I believe that the methods and processes herein set forth, as well as the various mechanisms which have been shown, are new with me, and that they open up a new and unexplored field of usefulness.

What I claim is:—

1. A hollow rotary member having an internal surface of definite shape surrounding the axis of rotation, a driving mechanism therefor, a filling trough arranged to hold a predetermined amount of material rotatably and slidably supported projecting into said member, and means for moving said trough.

2. A hollow rotary member having an internal surface of definite shape surrounding the axis of rotation, a driving mechanism therefor, a rotatably supported filling trough arranged to hold a predetermined amount of material projecting into said member, means for longitudinally sliding said trough and means for stopping the longitudinal movement thereof in definite relations to said rotary member.

3. A hollow cylinder, a refractory lining therefor, means for rotating the cylinder about its axis, means for introducing a molten mass into the cylinder, said means comprising a rotatably and slidably supported filling trough arranged to hold a predetermined amount of material, and means for preventing the escape of said mass, said cylinder being arranged to impart rotation to the mass to thereby subject it to the action of centrifugal force.

4. A hollow cylinder, means for rotating the cylinder about its axis, a trough within said cylinder for introducing a fixed quantity of a plastic mass into the cylinder while said cylinder is rotating, means for rotatably and slidably supporting the trough, and means for moving the trough, said cylinder being arranged to hold the mass and to impart rotation to it, thereby subjecting the mass to the action of centrifugal force.

5. A hollow cylinder, means for heating the cylinder, means for rotatably supporting the cylinder, a driving mechanism for rotating said cylinder about its axis, a trough within the cylinder for introducing a fixed quantity of a molten mass into the cylinder while said cylinder is rotating, means for rotatably and slidably supporting the trough, manual means for moving the trough, and means for holding said mass within a desired part of the length thereof, said cylinder being arranged to hold the mass and to impart rotation to it, thereby subjecting the mass to the action of centrifugal force.

6. A rotary member comprising a plurality of hollow cylinders fastened together in alinement with each other, means for rotatably supporting said member, a driving mechanism, means for introducing a molten mass into the cylinders, means comprising an annular stop core for holding said mass in the cylinders within a desired part of the length thereof, said cylinders being arranged to impart rotation to the mass, to thereby subject it to the action of centrifugal force.

7. A hollow rotary member, symmetrical to its axis of rotation, provided with a plurality of compartments disposed with their longitudinal axes parallel to the axis of rotation, said member being arranged to impart rotation to a plastic mass and arranged to move said mass in said compartments around said axis while it is rotating.

8. A hollow cylinder, means for rotating the cylinder about its axis, said cylinder being arranged to hold a mass of temporarily plastic material and to impart rotation to the mass, thereby subjecting said mass to the action of centrifugal force, means for dividing the inner surface of said cylinder in a plurality of longitudinal compartments open toward the axis of rotation and having their longitudinal axes parallel to said axis of rotation.

9. A hollow cylinder, means for rotating the cylinder about its axis, said cylinder being arranged to hold a mass of temporarily plastic material and to impart rotation to the mass, thereby subjecting said mass to the action of centrifugal force, and a plurality of removable longitudinally disposed cores dividing the inner surface of said cylinder into a plurality of compartments having unrestricted openings toward the axis of rotation.

10. The herein-described method of purifying temporarily plastic material and forming it into ingots, comprising rotating the material around an axis to thereby subject it to pressure in all directions transverse to said axis and molding it in compartments parallel with the axis of rotation having unrestricted openings toward the axis of rotation.

11. The herein-described method of purifying molten material and forming it into ingots, comprising distributing said material by rotation into a plurality of compartments parallel with the axis of rotation having unrestricted openings toward the axis of rotation, subjecting it to the action of centrifugal force to thereby force out of the molten mass unhomogeneous particles and allowing to harden while under the pressure thus obtained.

In testimony whereof I have signed my name to this specification in the presence of two subscribing witnesses.

WILLIAM H. MILLSPAUGH.

Witnesses:
W. J. BENTIL,
C. L. MIELKE.